US007590287B2

(12) United States Patent
Lu et al.

(10) Patent No.: US 7,590,287 B2
(45) Date of Patent: Sep. 15, 2009

(54) METHOD FOR GENERATING A QUALITY ORIENTED SIGNIFICANCE MAP FOR ASSESSING THE QUALITY OF AN IMAGE OR VIDEO

(75) Inventors: Zhongkang Lu, Singapore (SG); Weisi Lin, Singapore (SG); Susu Yao, Singapore (SG); Ee Ping Ong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 266 days.

(21) Appl. No.: 10/534,415

(22) PCT Filed: Nov. 6, 2002

(86) PCT No.: PCT/SG02/00259

§ 371 (c)(1),
(2), (4) Date: Mar. 9, 2006

(87) PCT Pub. No.: WO2004/043054

PCT Pub. Date: May 21, 2004

(65) Prior Publication Data

US 2006/0233442 A1 Oct. 19, 2006

(51) Int. Cl.
*G06K 9/46* (2006.01)
(52) U.S. Cl. .................................................. 382/190
(58) Field of Classification Search ....................... None
See application file for complete search history.

(56) References Cited

U.S. PATENT DOCUMENTS

| 6,055,015 | A | 4/2000 | Edwards ...................... 348/192 |
| 6,243,419 | B1 | 6/2001 | Satou et al. ............ 375/240.13 |
| 6,389,072 | B1 | 5/2002 | Tzou et al. ................... 375/240 |
| 2002/0126891 | A1 | 9/2002 | Osberger ..................... 382/165 |

FOREIGN PATENT DOCUMENTS

EP 1109132 12/2000
WO WO 99/21173 4/1999

OTHER PUBLICATIONS

Wang, Z. et al., " A Universal Image Quality Index," IEEE Signal Processing Letters, vol. 9, No. 3, Mar. 2002.
Wang, Z. et al., "No-Reference Perceptual Quality Assessment of JPEG Compressed Images," Laboratory for Image Video Engineering (LIVE), Dept. of Electrical and Computer Engineering, The University of Texas at Austin, 2002.

(Continued)

*Primary Examiner*—Vikkram Bali
*Assistant Examiner*—Elisa M Rice
(74) *Attorney, Agent, or Firm*—Niky E. Syrengelas, Esq.; K. David Crockett, Esq.; Crockett & Crockett

(57) ABSTRACT

A method for generating a quality oriented significance camp for assessing the quality of an image or video, comprising the steps of extracting features of the image or video, determining a perceptual quality requirement of at least one extracted feature and integrating the extracted features and the perceptual quality requirement of the at least one extracted feature to form an array of significance level values, thereby generating the quality oriented significance map.

10 Claims, 11 Drawing Sheets

OTHER PUBLICATIONS

Bober, Miroslaw, "MPEG-7 Visual Shape Descriptors," IEEE Transactions on Circuite and Systems for Video Technology, vol. 11, No. 6, Jun. 2001.

Winkler, Stefan, "Vision Models and Quality Metrics for Image Processing Applications, 2000," Swiss Federal Institute of Technology/Lausanne, 2000.

Christian J. Van Den Branden Lambrecht, "Perceptual Models and Architectures for Video Coding Applications," Swiss Federal Institute of Technology/Lausanne, 1996.

Itti, L. et al., "Computational Modelling of Visual Attention," Nature Review, vol. 2, Mar. 2001.

Laurent Itti, "Visual Attention," University of Southern California, 2003.

Wolf, S. et al., "Spatial-temporal Distortion Metrics for In-Service Quality Monitoring of any Digital Video System," Institute for Telecommunication Services, 1999.

Stefen Winkler, "Vision Models and Quality Metrics for Image Processing Applications", Ph.D. thesis #2313, Swiss Federal Institute of Technology, Lusanne, Switzerland, 2000.

S. Yao, et al, "Video Quality Assessment Using Neural Network Based on Multi-Feature Extraction", submitted to IEE Electrical Letters, 2003.

S. Yao, et al, "Perceptual Visual Quality Evaluation with Multi-Feature" Laboratories for Information Technology, 2003.

METHOD FOR GENERATING A QUALITY ORIENTED SIGNIFICANCE MAP FOR ASSESSING THE QUALITY OF AN IMAGE OR VIDEO

BACKGROUND OF THE INVENTION

Visual distortion metrics play an important role on monitoring the quality of broadcasted image/video, controlling compression efficiency and improving image enhancement processes. There are generally two classes of quality or distortion assessment approaches. The first class is based on mathematically defined measurements, such as the widely used mean square error (MSE), peak signal to noise ratio (PSNR), etc. The second class is based on measuring the distortion by simulating the human visual system (HVS) characteristics.

In the first class approach, the definition of MSE is given by $$MSE = \frac{1}{N^2} \sum_i \sum_j (c_{i,j} - \hat{c}_{i,j})^2$$

wherein $c_{i,j}$ and $\hat{c}_{i,j}$ is a pixel value in an original image and a distorted image, respectively. The definition of PSNR is $$PSNR = 10\log_{10} \frac{255^2}{MSE}$$

The advantage of the first class approach is that it is mathematically simple and low in computational complexity. For this reason, the first class approach is widely adopted.

The second class approach however aims at perception results which are closer to human vision, and hence, leads to better accuracy in visual assessment and information processing. However, due to incomplete understanding of the HVS and lag in incorporating physiological and/or psychological findings to the HVS, the performance of the second class approach is still not satisfactory.

There are physiological and psychological evidences that an observer who looks at an image or video does not pay attention to all visual information of the image or video, but only focuses on certain regions. Such visual attention information from the observer is used in HVS in many applications, e.g. for computation of a search process in visual perception, or to evaluate the quality of an image or video.

Visual attention may be implemented by either a bottom-up process or a top-down process. In the bottom-up process, visual attention is based on stimuli from visual features of the image/video, and a saliency map for the image/video is formed based on such stimuli. Examples of visual feature based stimuli include illumination, color, motion, shape, etc. In the top-down process, the saliency map for the image/video is formed based on prior/domain knowledge or indication from other known information like sound.

[1] discloses a method that combines three factors, namely loss of correlation, luminance distortion and contrast distortion, to measure distortion of an image.

[2] proposes a no-reference quality metrics 100 as shown in FIG. 1. Distorted image/video 101 is received by an artifact extraction unit 102 to detect the distribution of blurring and blockiness of the image/video 101. Such distribution properties of blurring and blockiness are discriminated in a discrimination unit 103 to generate an output signal 104 representing the distortion value of the distorted image/video 101.

The methods according to [1] and [2] belong to the first class approach, and hence, do not provide results which are close to human perception as compared to the second class approach.

[3] proposes a metric 200 based on video decomposition and spatial/temporal masking as shown in FIG. 2. A reference image/video 201 and a distorted image/video 202 are each received by a signal decomposition unit 203,204. The respective decomposed signals 205,206 are each received by a contrast gain control unit 207,208 for spatial/temporal masking of the decomposed signal 205,206. The respective processed signals 209,210 are processed by a detection and pooling unit 111 to generate an output signal 212 representing the distortion value of the distorted image/video 202.

[4] uses a neural network to combine multiple visual features for measuring the quality of an image/video as shown in FIG. 3. Reference image/video 301 and distorted image/video 302 are input to a plurality of feature extraction units 303 to extract various features of the image/video 301,302. The extracted features 304 are received by a neural network 305 to generate the distortion value 305 of the distorted image/video 302.

[5] discloses a method for evaluating the perceptual quality of a video by assigning different weights to several visual stimuli.

The references [4] and [5] process the whole image or video equally, and hence, is not computational efficient as insignificant portions of the image/video are also processed.

[6] uses several bottom-up visual stimuli to determine regions of high visual attention in an image/video. The features determined from these bottom-up visual stimuli are weighted and accumulated to form an Importance Map indicating the regions of high visual attention. This method does not result in very good quality assessment of the image/video as only bottom-up features are determined. Furthermore, high visual attention of a region does not always mean that the region should be coded with a high quality.

[7] discloses a method similar to [6], but uses both bottom-up and top-down visual stimuli to determine regions of high visual attention in the image/video. The determined features obtained from the bottom-up and top-down visual stimuli are integrated together using a Bayes network, wherein the Bayes network has to be trained prior to the integration. As mentioned, high visual attention of a region does not always mean that the region should be coded with a high quality. Moreover, the use of a Bayes network for integrating the features of the image/video is complex as the Bayes network needs to be trained prior to integrating the features.

Therefore, a more accurate and yet robust method of assessing the quality or distortion of an image or video is desired.

SUMMARY OF THE INVENTION

It is an object of the invention to provide a method which is able to improve the performance of the existing methods of assessing the quality or distortion of an image or video.

The object is achieved by the features of the independent claims. Additional features result from the dependent claims.

The present invention relates to a method for generating a quality oriented significance map for assessing the quality of an image or video, comprising the steps of extracting features of the image or video, determining a perceptual quality requirement of at least one extracted feature, and integrating the extracted features and the perceptual quality requirement of the at least one extracted feature to form an array of significance level values, thereby generating the quality oriented significance map.

Furthermore, at least one of the extracted features is used to determine a perceptual quality requirement of the image/video based on that feature. In other words, the importance of the quality of the image/video as perceived by an observer based on the extracted features is determined.

The significance level values obtained from integrating the extracted features and the perceptual quality requirement of the at least one extracted feature forms a 3-D for an image or 4-D array for a video. Such an array of significance level values is used as the quality oriented significance map for assessing the quality or distortion of the image or video.

It should be noted that the visual attention of a certain region of the image/video do not always correspond to a high quality of the same region of the image/video. In other words, a high visual attention of a certain region of the image/video does not always require that region of the image/video to be coded with a high quality, and vice versa.

Since the perceptual quality information is used for determining the significance level values, the resultant significance map follows closely the perceptual quality requirement of the image/video. Therefore, a more accurate significance map for assessing the quality of an image or video is achieved, as compared to any of the prior art which uses a map based only on visual attention.

The significance map generated according to the invention can be used in the existing distortion metrics for both the first class approach and the second class approach, and therefore, improves the accuracy of the image/video quality assessment process.

According to the invention, the features of the image or video are extracted using visual feature-based information and knowledge-based information. In other words, both bottom-up process (visual feature-based) and top-down process (knowledge-based) are used. These processes determine which features in the image/video cause visual attention, and extract such visual attention causing features accordingly. The features to be extracted may include motion, illumination, color, contrast, orientation, texture, etc. Existing image/video descriptors, for example MPEG-7 descriptors may also be used.

According to the invention, object motion in a video or a sequence of images are separated into a relative motion vector and an absolute motion vector. Relative motion is the object motion when compared with the background or with other objects, and absolute motion is the actual motion of the object in an image or a video frame. Based on the determined relative and absolute motion vectors, a quality level value of the object (pixels or region) is determined. The determined quality level value is integrated with other extracted features from the image/video for forming the array of significance level values.

The object motion analysis can be separated into two steps: global motion estimation and motion mapping. The global motion estimation gives an estimation of the movement of a camera of the image or video, and the motion analysis extracts the relative and absolute motion vectors of the object.

It should be noted that other features of the image/video may be used to determine the quality level values of the pixel or region of the image/video. Examples of other features include face detection, human detection and texture analysis. Such determined quality level values from these other features may be integrated with the quality level values obtained from motion analysis to generate the quality oriented significance level.

According to the preferred embodiment of the invention, all the extracted features and the determined quality level values of the at least one feature are integrated to form the array of significance level values using a non-linear mapping function.

The use of non-linear mapping function has the advantage of low computational requirements and simple implementation. Furthermore, an algorithm or system for a non-linear mapping function does not require training, which is in contrast to the Bayes network used in the system disclosed in [5].

It should be noted that in alternative embodiments, other techniques like neural network or fuzzy rules may be used for integrating the extracted features and the determined quality level values of the at least one feature.

According to a further preferred embodiment of the invention, coupling effects as a result of integrating the extracted features are taken into consideration when forming the array of significance level values. The use of coupling effects takes into account that different extracted features, which can be taken as saliency effects, are not integrated by adding them in a linear manner. Different combinations of extracted effects give rise to different coupling effects.

Specifically, the quality oriented significance map according to the further preferred embodiment of the invention can be obtained using the following equation:

$$m_{s,i,j,t} = \sum_{n}^{N} f_{s,i,j,t}^{n} - \sum_{k} c^{Lk} \cdot g_1(f_{s,i,j,t}^{L}, f_{s,i,j,t}^{k})$$

wherein $m_{s,i,j,t}$ is an element of the quality oriented significance map at scale s, position (i,j) and time t, $f_{s,i,j,t}^{n}$ is $n^{th}$ extracted feature, $c^{Lk}$ is a coupling factor which denotes the coupling effects of combining $f_{s,i,j,t}^{L}$ and $f_{s,i,j,t}^{k}$;

n is the index of the extracted feature;

k is another index of extracted feature such that 1<k<N and k≠L;

N is the total number of extracted features; and $g_1$ is the nonlinear coupling mapping function which is defined as $g_1(x,y)=\min(x,y)$;

and L is the maximum value of $f_{s,i,j,t}^{n}$ denoted as $L=\arg\max(f_{s,i,j,t}^{n})$.

In an alternative preferred embodiment of the invention, the integration of the extracted features is performed by applying a non-linear mapping function to a summation of weighted extracted features.

Specifically, the quality oriented significance map according to the alternative preferred embodiment of the invention is obtained using the following equation:

$$m_{s,i,j,t} = g_2(w_1 f_{s,i,j,t}^{1} + w_2 f_{s,i,j,t}^{2} + \ldots + w_n f_{s,i,j,t}^{n})$$

wherein $g_2$ is the nonlinear mapping function, which is defined as $$g_2(x) = \sqrt[\alpha]{x+C}.$$

wherein

α is a parameter for giving a nonlinear property, and

C is a constant.

According to the preferred embodiment of the invention, the method for generating the quality oriented significance map further comprises a post processing step for processing the generated quality oriented significance map. The post processing step enhances the quality of the generated significance map by removing any noise which may be present. Also, the post processing step may be used for other operations including smoothing or expanding the significance map, and removing artifacts present in the significance map.

In particular, Gaussian smoothing is used to remove impulse noise caused by errors during the extraction of features according to the preferred embodiment of the invention.

The described embodiments of the invention apply not only to the method, but also to a device, a computer readable medium and a computer program.

DETAILED DESCRIPTION OF THE PREFERRED EMBODIMENT OF THE INVENTION

Figure 4:
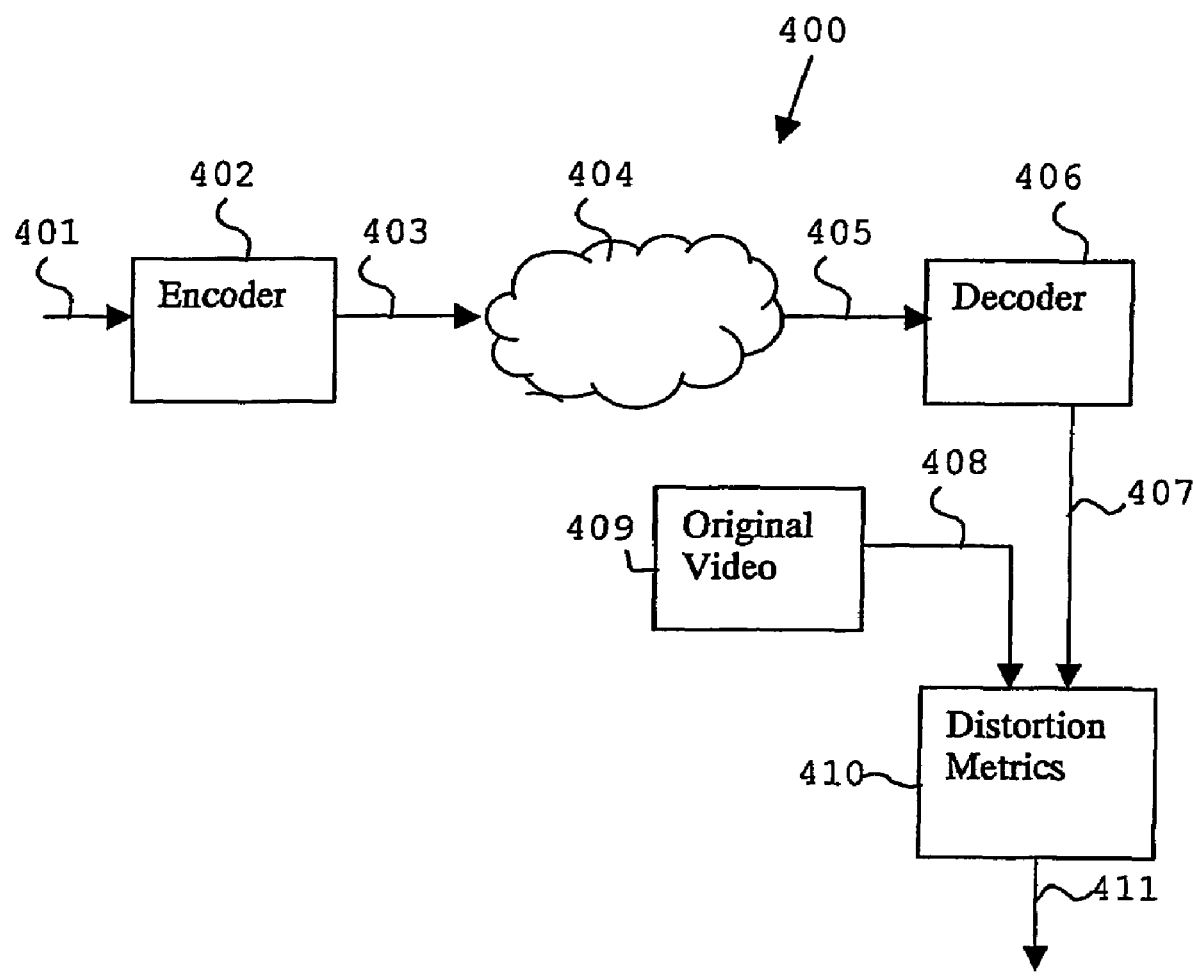
FIG. 4 shows a general system for monitoring quality of video for a broadcasting system.

FIG. 4 describes a general system for monitoring quality of video for a broadcasting system.

An image/video source 401 is encoded in an encoder unit 402 and the encoded image/video 403 is transmitted over a Wide Area Network (WAN) 404. The transmitted image/video 405 from the WAN 104 is received by a decoder unit 106 to be decoded.

A distortion metrics unit 410 receives the decoded image/video 407 from the decoder unit 406 with/without a reference image/video 408. The reference image/video 408 is generated from an image/video source unit 409, wherein the image/video source unit 409 may be identical to an image/video source unit used to generate the original image/video 401, or the reference image/video 408 may be simply extracted from the original image/video 401 which was encoded in the encoder unit 402.

Generally, distortion metrics can be categorized into Full Reference (FR), Reduced Reference (RR) and No Reference (NR) models. FR metrics performs pixel-by-pixel and frame-by-frame comparison between a distorted image sequence and the corresponding non-distorted counterpart. Reduced-Reference metrics computes a few statistics from the distorted image sequence, and compares them with corresponding stored statistics of the undistorted image sequence. The statistics are chosen and correlated by a conventional regression analysis. No-Reference metrics does not require any information from the undistorted image sequence, but performs feature extraction on the distorted sequence to find artifacts such as MPEG block boundaries, point-like noise, or image blurriness.

The distortion metrics unit 410 compares both the reference image/video 408 and the decoded image/video 407 (for the case of FR and RR), or analyze the artifacts of decoded image/video 407 (for the case of NR) to assess the quality of the decoded image/video 407. The output signal 411 generated by the distortion metrics unit 410 represents the quality of the decoded image/video 407.

The distortion metrics unit 410 may be implemented using the distortion metrics as already described above (see FIG. 1, FIG. 2 and FIG. 3).

According to the invention, a quality oriented significance map, in particular, a Hierarchical Quality-oriented Significance Map (HQSM) is proposed. The HQSM is generated based on both visual attention and perceptual quality requirements of an image/video.

For a bottom-up process, a map of significance level values of pixels or regions of the image/video can be determined from visual features based on several rules:

1. Eye fixation position of an observer is not always fixed on a high visual attention area, but eye movement follows high visual attention area;
2. Different features of the image/video do not add linearly to give an accumulated effect;
3. Observer eyes are not blind to the world outside the region of focus or attention;
4. The selection of image/video features may be spatial-based or object-based; and
5. Integration and selection of stimuli causing visual attention rely on a hierarchy of "winner-takes-all" (WTA) process at one moment.

It should be noted that the last rule 5) is only true for the same observer for a particular moment. For a group of observers, the attention area can be represented in a statistical map. Also for a single observer, more than one salient region may result when the image/video is observed over a period of time. The salient regions may also be represented in a statistical map.

For a top-down process, another map of significance level values of the pixels or regions of the image/video may be defined using domain or prior knowledge from other media. For example, an audio sound of an airplane will cause the observer to focus his attention to the object of the airplane in the image/video.

Figure 5:
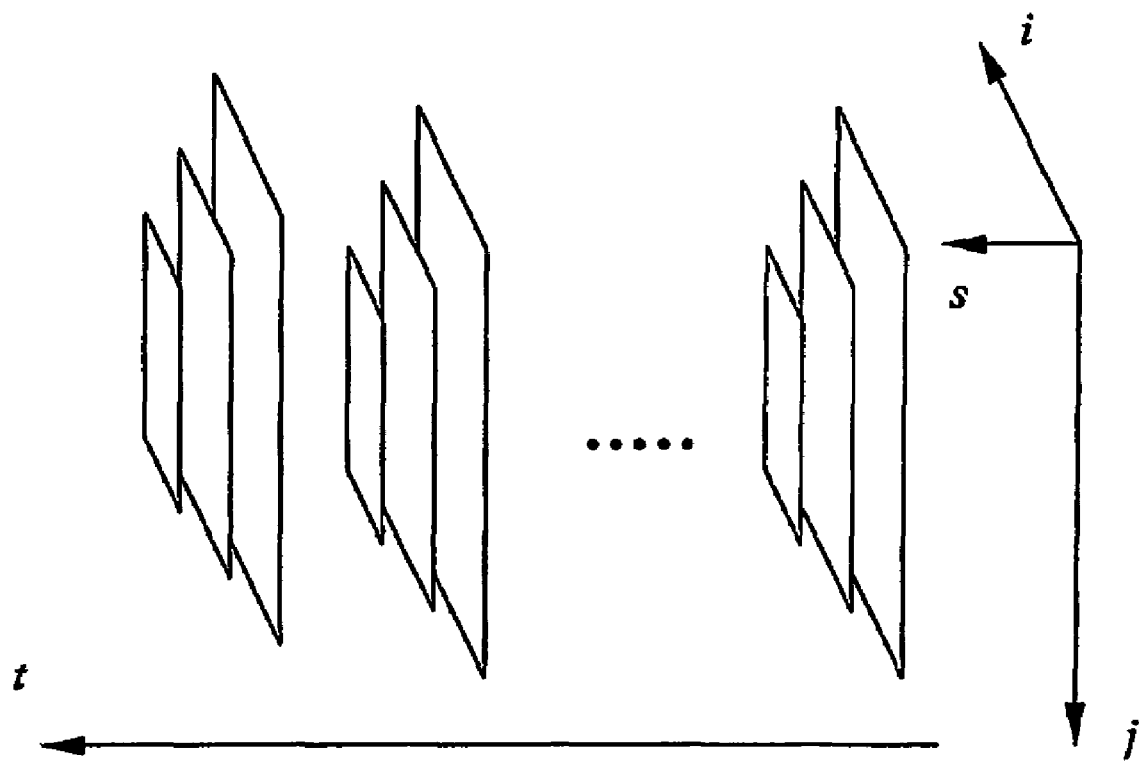
FIG. 5 shows a diagram of the quality oriented significance map according to the invention.

The significance maps generated above are integrated to form the HQSM. The HQSM according to the invention is a 3-dimensional array for an image, or a 4-dimensional array for a video, as illustrated in FIG. 5.

The HQSM may be expressed using the following equation:

$$M = \{m_{s,i,j,t}, 0 \leq s < N_s - 1, 0 \leq i < W_s - 1, j < L_s - 1, 0 \leq t < N_t - 1\} \quad (1)$$

wherein

M denotes the HQSM, $m_{s,i,j,t}$ denotes a map element of the HQSM at scale s, position (i,j) and time t, $W_s$ is the width of the image or a frame of the video, $L_s$ is the height of the image or a frame of the video, and $N_t$ is the time interval of the video (applicable for video only).

A high value of the map element $m_{s,i,j,t}$ represents a high significance level of a pixel or region of the image/video, and a high weight should be assigned to the distortion measurement of that corresponding pixel or region, and vice versa.

Figure 6:
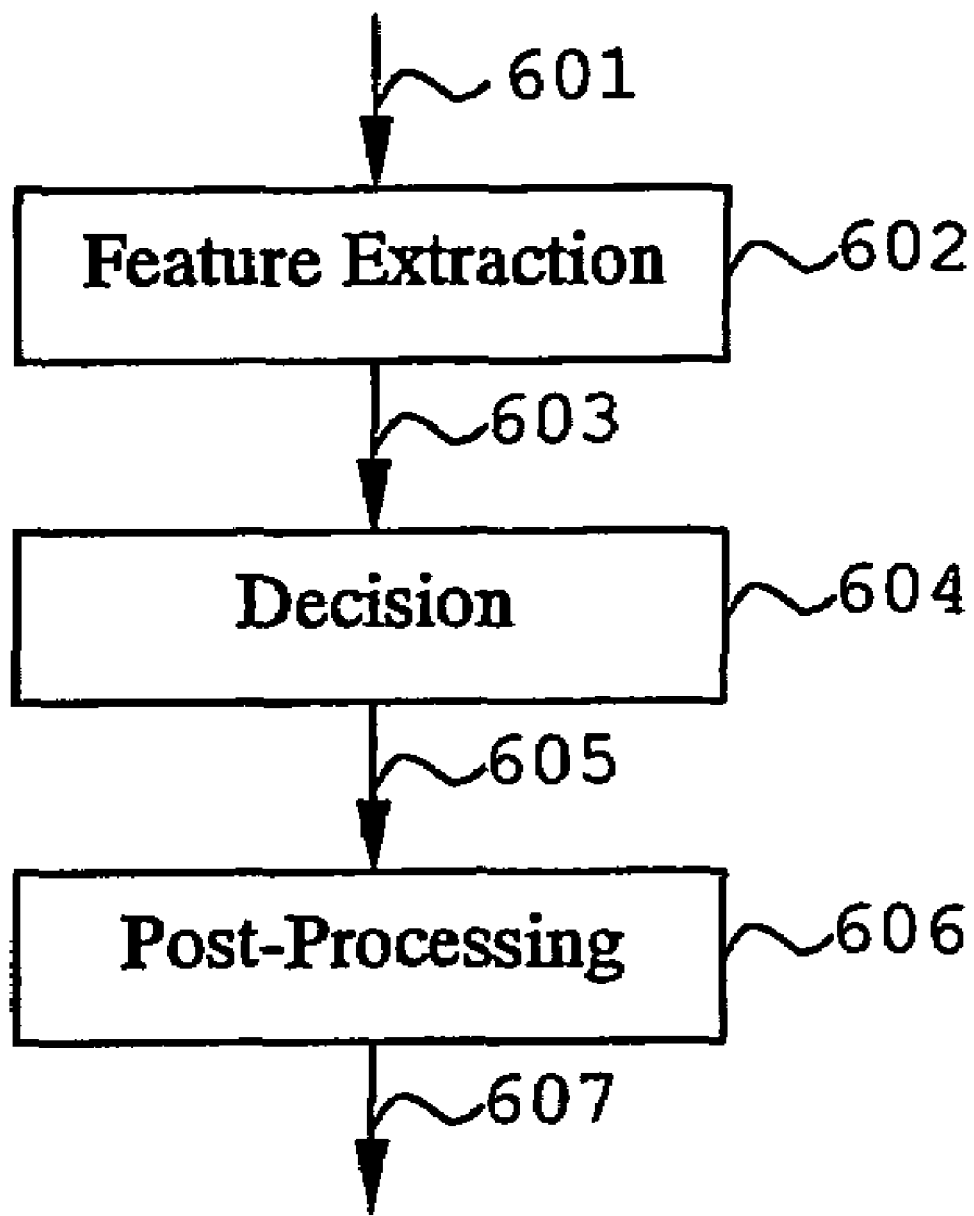
FIG. 6 shows a general block diagram for generating the quality oriented significance map according to the preferred embodiment of the invention.

The generation of the HQSM comprises three steps as shown in FIG. 6. The visual features of the image/video 601 are extracted in a feature extraction unit 602 based on the following stimuli:

1. Visual attention stimuli, for example motion, illumination, color, contrast, orientation, texture, etc.
2. Knowledge based stimuli, for example face, human, shapes, etc.
3. User defined stimuli.

It should be noted that existing image/video descriptors such as MPEG-7 descriptors may be incorporated for features extraction.

The extracted features 603 are received by a decision unit 604 for integrating the extracted features 603 to generate a gross HQSM 605. The gross HQSM 605 is further processed by a post processing unit 606 to enhance the quality of the gross HQSM 605 to generate the final HQSM 607 according to the preferred embodiment of the invention.

Figure 7:
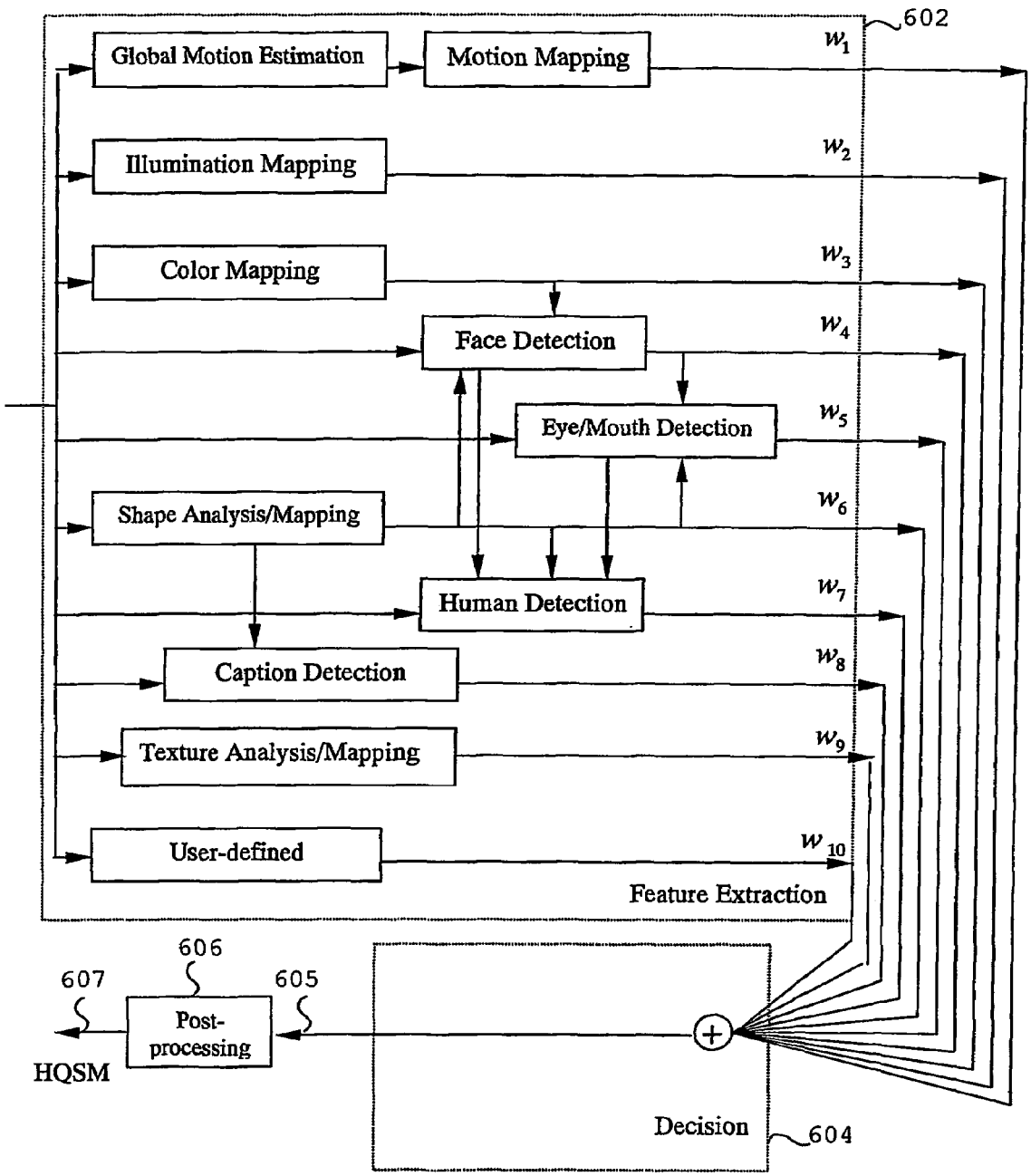
FIG. 7 shows a detail implementation of the quality oriented significance map according to the preferred embodiment of the invention.

FIG. 7 shows the detailed diagram for the generation of the HQSM according to the preferred embodiment of the invention. The different features to be extracted according to the preferred embodiment of the invention are summarized below.

Motion Analysis

Object motion in a video or a sequence of image can be separated into two vectors: relative motion vector and absolute motion vector. Relative motion is the motion of object in relation to the background or other objects. Absolute motion is the exact position moved within the image or video frame.

The motion analysis can be separated into global motion estimation to determine the movement of a camera used for the image/video and motion mapping to extract the relative and absolute motion vector.

The global motion estimation can be estimated using a three-parameter method, which is modeled as:

$$\begin{pmatrix} \Delta X \\ \Delta Y \end{pmatrix} = C_f \times \begin{pmatrix} X \\ Y \end{pmatrix} + \begin{pmatrix} t_x \\ t_y \end{pmatrix} \quad (2)$$

wherein $(\Delta X, \Delta Y)$ is the estimated motion vector of the pixel or region (X,Y) of the video, $C_f$ is the zooming factor, and $(t_x, t_y)$ is the translation vector.

It should be noted that the estimated motion vector ($\Delta X$, $\Delta Y$) is also the absolute motion vector.

The three-parameter method is preferred as it is less sensitive to noise as compared to other modeling methods like the six-parameter model or four-parameter model.

The error of the global motion estimation can be defined as:

$$\epsilon = \Sigma[(\Delta X - C_f X - t_x)^2 + (\Delta Y - C_f Y - t_y)^2] \quad (3)$$

The values of $C_f$, $t_x$ and $t_y$ can be obtained by minimizing the three equations as given below:

$$\begin{pmatrix} C_f \\ t_x \\ t_y \end{pmatrix} = \begin{pmatrix} \sum X & N & 0 \\ \sum Y & 0 & N \\ \sum X^2 + \sum Y^2 & \sum Y & \sum X \end{pmatrix}^{-1} \begin{pmatrix} \sum \Delta X \\ \sum \Delta Y \\ \sum X \cdot \Delta X + \sum Y \cdot \Delta Y \end{pmatrix} \quad (4)$$

A relaxation algorithm can be used to determine the minimized values of $C_f$, $t_x$ and $t_y$ which is summarized in the following steps:

1. Choose the pixels or regions on the image/video with large variations;
2. Determine ($C_f$, $t_x$, $t_y$) within the chosen pixels which satisfies equation 4;
3. Evaluate error $\epsilon$ for every pixel using equation 3;
4. Select the pixels of the image/video within a range of error [$\epsilon - \Delta, \epsilon + \Delta$],
5. Repeat steps 2 and 3 until ($C_f$, $t_x$, $t_y$) is smaller than a predetermined value.

After ($C_f$, $t_x$, $t_y$) is obtained, the relative motion can be determined using the following equation:

$$\begin{pmatrix} \Delta X_R \\ \Delta Y_R \end{pmatrix} = \begin{pmatrix} \Delta X \\ \Delta Y \end{pmatrix} - C_f \times \begin{pmatrix} X \\ Y \end{pmatrix} + \begin{pmatrix} t_x \\ t_y \end{pmatrix} \quad (5)$$

The relationship between attention level and relative motion vector is a nonlinear monotonic ascending function. The attention level increases with increasing relative motion. When the relative motion reaches a certain value, the attention level does not increase with any further increase of the relative motion. Therefore, the relationship between the relative motion vector and the attention level can be represented by:

$$f_r(x_r) = \begin{cases} a \cdot x_r^b & 0 < x_r \leq 10 \\ a \cdot 10^b & x_r > 10 \end{cases} \quad (6)$$

wherein $X_r$ is the relative motion vector defined as $x_r = \sqrt{\Delta X_R^2 + \Delta Y_R^2}$; and a and b are parameters with a>0, b<1 and $a \cdot 10^b = 1$.

Similarly, the relationship between attention level and the absolute motion is a nonlinear function. When the absolute motion increases, the attention level increases correspondingly and subsequently decreases. The relationship between the attention level and the absolute motion vector can be defined as:

$$f_a(x_a) = c \cdot x \cdot e^{-dx} \quad (7)$$

wherein $x_a$ is the absolute motion vector defined as $x_a = \sqrt{\Delta X^2 + \Delta Y^2}$;

c and d are parameters assigned so that $\max[f_a(x_a)] = 1$.

As can be seen from equation (7), when $$x = \frac{1}{d},$$

$f_a(x)$ is maximum, and hence c=de.

The overall motion attention level can then be determined as:

$$f_{total}(x) = f_a(x) \cdot f_r(x) \quad (8)$$

The relationship between relative motion, absolute motion, attention level and perceptual quality level can be summarized in Table 1 as shown:

TABLE 1

| Relative motion | Absolute motion | Attention level | Quality level |
|---|---|---|---|
| Low | Low | Low | Low |
| High | Low | High | High |
| Low | High | Low | Low |
| High | High | High | Medium |

As can be seen from table 1, an object with a high absolute motion attracts visual attention of the observer. However, the observer will not bother about the quality of the object. For example, the observer will follow the movement of a flying ball in a sequence of images or video, but do not pay much attention to the shape (quality) of the flying ball. When the relative motion of the flying ball is high, and the absolute motion is low, the observer pays much attention to the shape (quality) of the flying ball.

An important point to note is that attention level is not always the same as the perceptual quality level. The perceptual quality requirement, in addition to the visual attention level, is also used to form the array of significance map according to the invention, thus resulting in the HQSM to be more accurate and robust in assessing the quality of image/video as compared to any of the prior art.

Illumination Mapping

High illumination or contrast of a region of an image/video usually generates a high visual attention. For example, a spot light illumination on a stage draws the visual attention of the audiences. Illumination may be estimation by applying a Gaussian smoothing filter to the image/video. Other means of illumination estimation may be used.

Color Mapping/Skin Color Mapping

Color mapping is similar to illumination mapping, except that a difference in the values between other regions of the image/video may also be used to determine the value of the current pixel or region.

Skin color attracts visual attention in many situations, and the detection of skin color can be performed in a Cb-Cr domain. In particular, a look-up table may be used to assign a possible color value to each pixel or region of the image/video. A skin color is detected when the value of the pixel falls in the range of 77<Cb<127 and 133<Cr<173.

Face Detection

Face detection is to detect face-like regions from the image/video, a face of a person in the image/video is likely to generate a high visual attention of the observer. Skin color and shape information is useful for face detection.

Eye/Mouth Detection

In a face region, the eye and mouth of the face usually draw a higher visual attention than the other parts of the face. Face detection and shape information can be used for the eye/mouth detection.

Shape Analysis/Mapping

Shape analysis is useful in determining object shapes in the image/video which cause visual attention. Information on shape analysis is useful also for detection of other information like face, eye/mouth, words caption, etc. Shape analysis can be performed by applying Watershed algorithm on the image/video frame, and split the image into smaller regions. A merge-split method and shape description/clustering methods as described in [9] can be performed to determine the shape of the objects in the image/video.

Human Body Detection

The detection of human body is possible using information obtained from shape analysis, face detection and eye/mouth detection.

Caption Detection

Captions in the image/video carry important information, and therefore, have high visual attention. Captions can be detected using the method as disclosed in [8].

Texture Analysis/Mapping

Texture has a negative effect on the overall value of the significance level value, and hence, on the generated HQSM. In other words, texture decreases the overall value of the map elements of the HQSM. Specifically, we have $$f_{s,i,j,t}^{texture} < 0 \quad (9)$$

wherein $f_{s,i,j,t}^{texture}$ represents the texture feature of the image/video.

Taking the texture feature into account when forming the array of significance level values increases the overall accuracy of a significance map, as the negative effect of texture of the image/video is considered. Therefore, the HQSM generated according to the invention has a higher accuracy compared to the significance map generated according to any of the prior art.

User Defined Attention

In this feature, the significance level of some or all the pixels or regions of the image/video are defined manually based on other information like audio, a deliberate focus of attention on a particular object, etc.

It should be noted that while only some of the features extractions are described, the invention should not be limited to the specific methods of features extraction, and also other features of the image/video may be further incorporated to the method of generation of HQSM according to the invention.

After all the features of the image/video are extracted, they are integrated in the decision unit 604. According to the preferred embodiment of the invention, a non-linear mapping function is used to integrated the extracted features.

Coupling effects as a result of combining any pair of extract features above are different, and a model for integrating a pair of extracted features which takes into consideration of the coupling effect is given as:

$$m_{s,i,j,t} = f_{s,i,j,t}^1 + f_{s,i,j,t}^2 - c^{12} g_1(f_{s,i,j,t}^1, f_{s,i,j,t}^2) \quad (10)$$

wherein $m_{s,i,j,t}$ is an element of the quality oriented significance map;

$c^{12}$ is the coupling factor representing the coupling effects;

$f_{s,i,j,t}^1$ and $f_{s,i,j,t}^2$ denotes a pair of extracted features;

n is the $n^{th}$ extracted feature; and $g_1$ denotes a non-linear function.

The non-linear mapping function should preferably be defined as $$g_1(x,y) = \min(x,y) \quad (11)$$

In a further preferred embodiment of the invention, three or more extracted features are integrated using the following equation:

$$m_{s,i,j,t} = \sum_n^N f_{s,i,j,t}^n - \sum_k c^{Lk} \cdot g_1(f_{s,i,j,t}^L, f_{s,i,j,t}^k) \quad (12)$$

wherein $f_{s,i,j,t}^n$ is the $n^{th}$ extracted feature, $c^{Lk}$ is a coupling factor which denotes the coupling effects of combining $f_{s,i,j,t}^L$ and $f_{s,i,j,t}^k$;

n is the index extracted feature;

k is another index of extracted feature such that 1<k<N and k≠L;

N is the total number of extracted features; and

L is the maximum value of $f_{s,i,j,t}^n$ and is denoted as $$L = \arg\max(f_{s,i,j,t}^n) \quad (13)$$

It should be noted from equation (12) that only the coupling effect between the extracted feature with the maximum value and other extracted features are considered. The coupling effects among other extracted features are ignored.

In an alternative preferred embodiment of the invention, the integration of the extracted features is performed using the following equation:

$$m_{s,i,j,t} = g_2(w_1 f_{s,i,j,t}^1 + w_2 f_{s,i,j,t}^2 + \ldots + w_n f_{s,i,j,t}^n) \quad (14)$$

wherein $w_1, w_2, \ldots, w_n$ are the weights of the extracted features, and $g_2$ is the non-linear mapping function.

The non-linear mapping function should preferably be $$g_2(x) = \sqrt[\alpha]{x + C} \quad (15)$$

wherein $\alpha$ is a parameter with the value $\alpha = 2$ to satisfy the non-linear property, and C is a constant with the value C=1 to take into consideration that the observer's eyes are not blind to the world outside the focus or attention.

In alternative embodiments, other techniques like neural network, fuzzy rules may be used for integrating the extracted features to form the significance map 605.

The significance map 605 generated from the integration of the extracted features are received by the post processing unit 606 to further enhance the quality of the generated significance map 605 to form the final HQSM 607.

In the post processing unit 606, a Gaussian smoothing filter can be applied to the generated significance map 605 to remove impulse noises caused by errors in the features extraction process 602.

The HQSM generated according to the invention may be applied to both the first class approach and the second class approach. Specifically, the HQSM may be incorporated to the MSE as given by $$MSE_{modified} = \frac{1}{N^2} \sum_i \sum_j m_{s,i,j,t} \times (c_{i,j} - \hat{c}_{i,j})^2 \quad (16)$$

wherein $MSE_{modified}$ is the modified MSE incorporating the HQSM.

The PSNR as a result of the modified MSE is thus given by $$PSNR_{modified} = 10\log_{10} \frac{225^2}{MSE_{modified}} \quad (17)$$

wherein $PSNR_{modified}$ is the modified PSNR value incorporating the HQSM.

After the HQSM is generated according to the invention, it can be applied to any existing distortion metrics to improve the accuracy of the distortion measurement or quality assessment.

Figure 8:
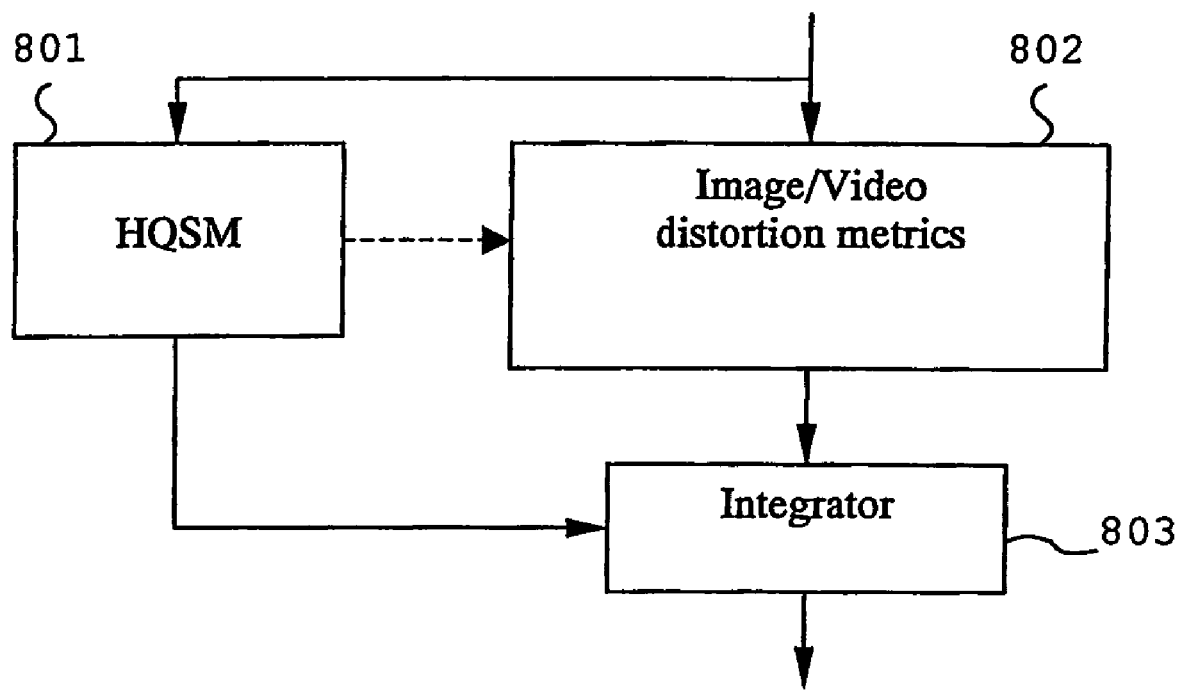
FIG. 8 shows a block diagram of a distortion metrics, incorporating the quality oriented significance map according to the invention.

FIG. 8 shows how the generated HQSM 801 may be incorporated to an existing distortion metrics 802. It should be noted that the HQSM 801 are separate from the processing of the image/video by the distortion metrics 802, and the output from the HQSM 801 and the distortion metrics 802 are integrated in an integrator unit 803.

Figure 1:
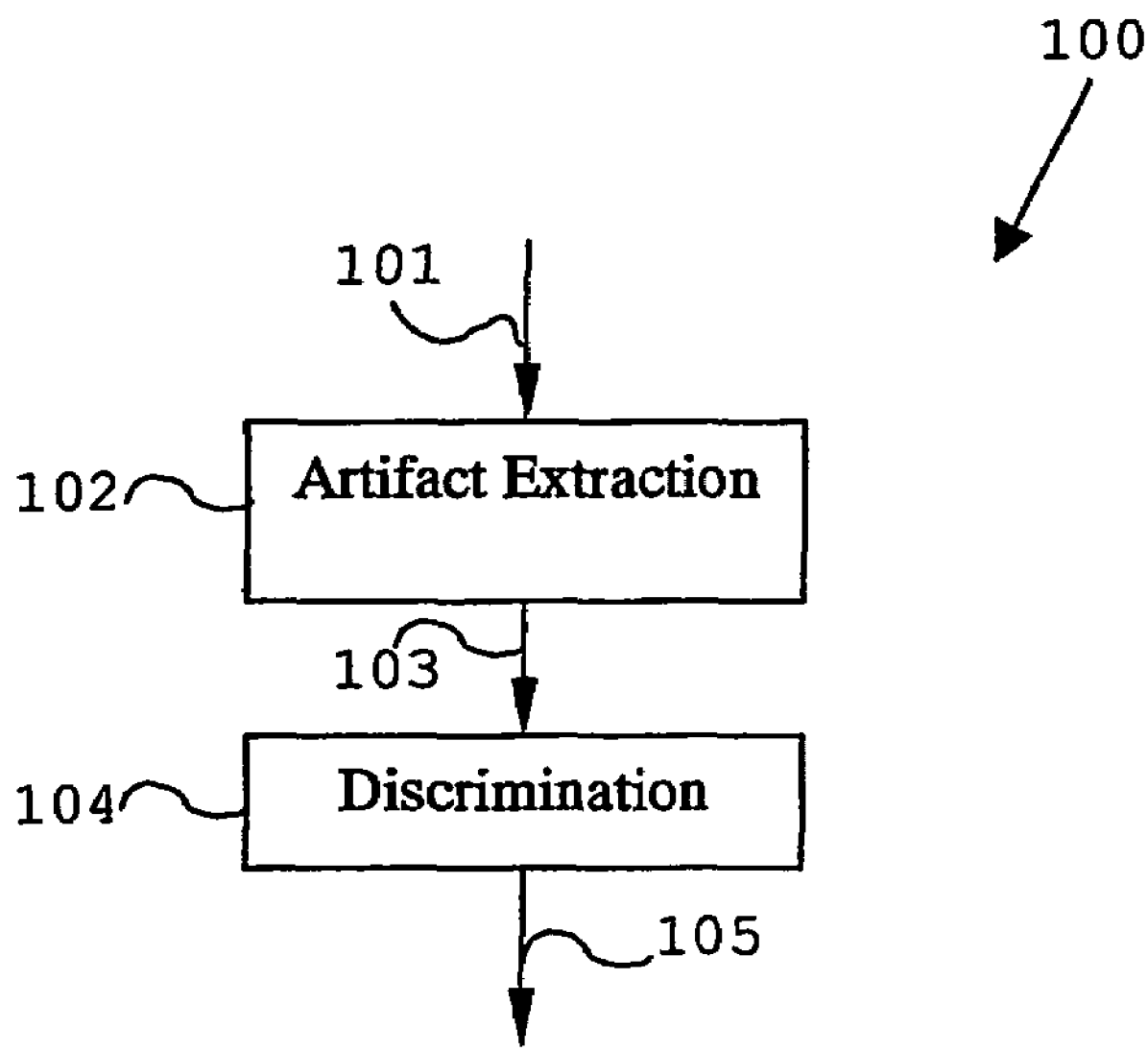
FIG. 1 shows a block diagram of a general none reference metrics for measuring perceptual image/video distortion.
Figure 2:
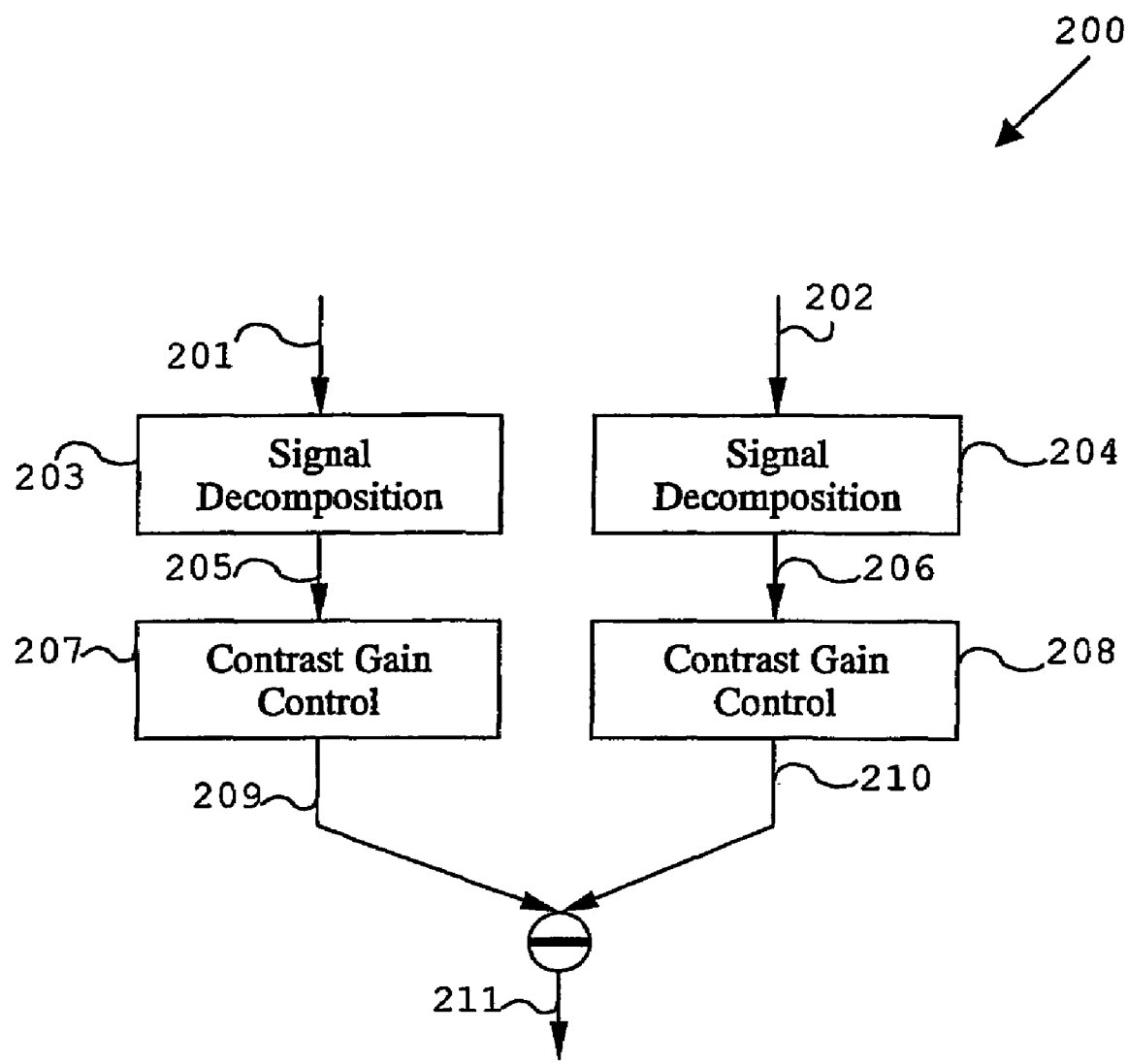
FIG. 2 shows a block diagram of the Winkler's full reference metrics for measuring perceptual image/video distortion.
Figure 3:
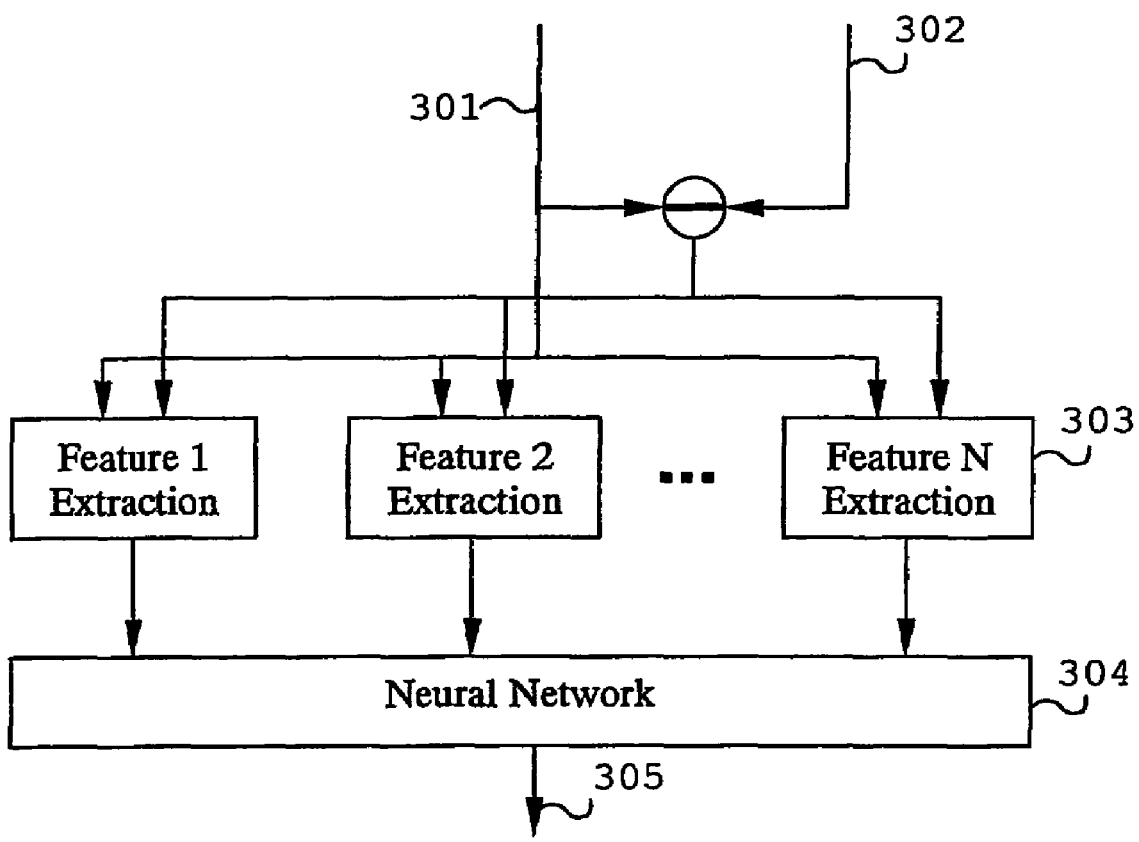
FIG. 3 shows a block diagram of the Yao's full reference metrics for measuring perceptual image/video distortion.
Figure 9:
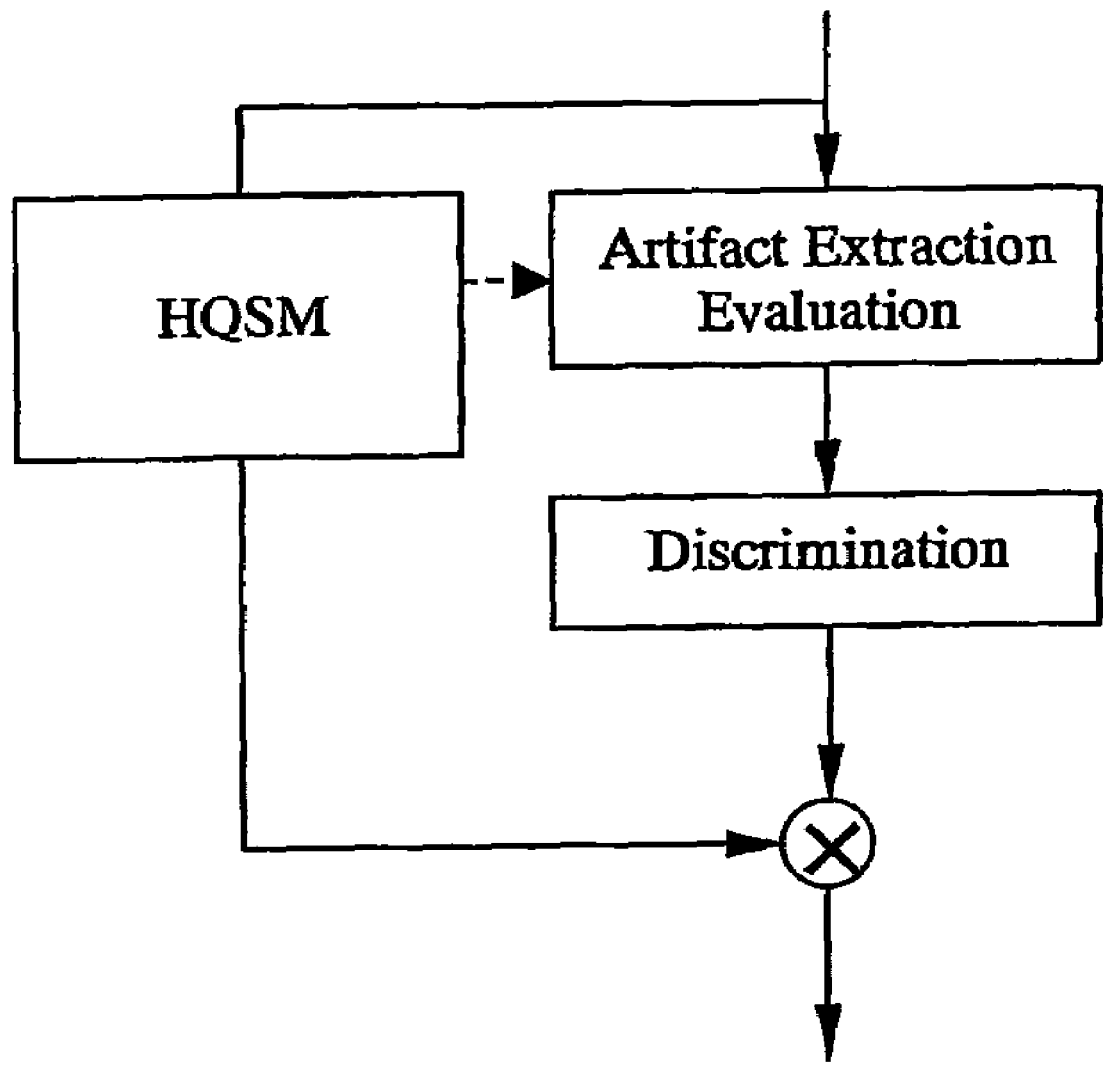
FIG. 9 shows a block diagram of the general none reference metrics for measuring perceptual image/video distortion of a distortion metrics, incorporating the quality oriented significance map according to the invention.
Figure 10:
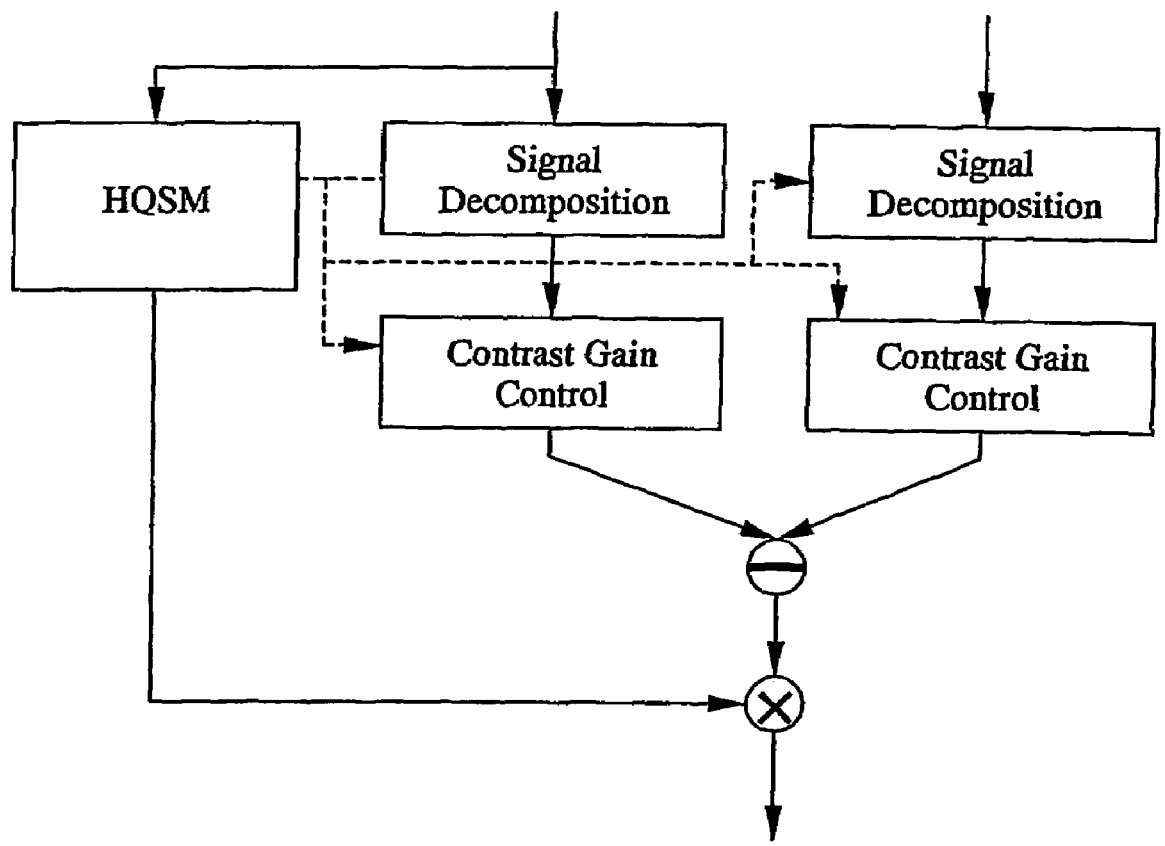
FIG. 10 shows a block diagram of Winkler's full reference metrics for measuring perceptual image/video distortion of a distortion metrics, incorporating the quality oriented significance map according to the invention.
Figure 11:
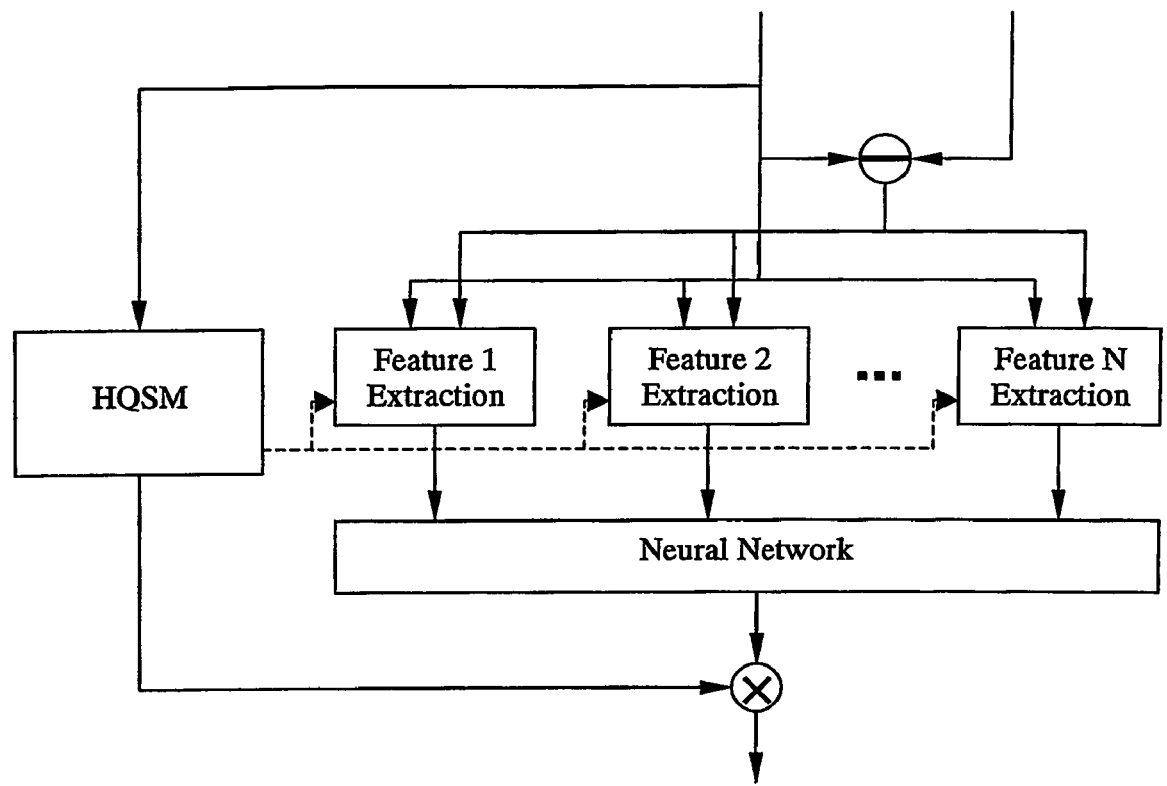
FIG. 11 shows a block diagram of Yao's full reference metrics for measuring perceptual image/video distortion of a distortion metrics, incorporating the quality oriented significance map according to the invention.

FIG. 9, FIG. 10 and FIG. 11 shows how the HQSM can be applied to the distortion metrics as shown in FIG. 1, FIG. 2 and FIG. 3. Since the application of HQSM to the distortion metrics are independent to the processing of the image/video by the distortion metrics, the HQSM may be applied to the distortion metrics at any stage of the quality assessment/distortion measurement process (as shown by the dotted lines).

Experiments are conducted to determine the performance of the HQSM according to the invention and the existing distortion metrics.

In the experiments, the HQSM is generated using features extracted based on illumination mapping, motion analysis, skin color mapping and face detection. The generated HQSM is applied to the PSNR method and, the distortion metrics disclosed in [1] (Wang's Metrics) and [2] (Winkler's Metrics). Two video sequences, denoted as "harp" and "autumn_leaves" are used as test video sequences for the assessment of the quality of the video sequences.

The results of the experiments are summarized in table 2:

TABLE 2

| Distortion Metrics | PSNR | HQSM-based PSNR | Wang's Metrics | HQSM-based Wang's Metrics | Winkler's Metrics | HQSM-based Winkler's Metrics |
|---|---|---|---|---|---|---|
| harp | 0.8118 | 0.85 | 0.6706 | 0.6853 | 0.6912 | 0.7412 |
| autumn_leaves | 0.1324 | 0.5441 | 0.9324 | 0.9265 | 0.8235 | 0.8647 |

As can be seen from the results of table 2, the distortion metrics with the HQSM incorporated gives better performance in the video quality assessment. The only exception is Wang's Metrics on the video sequence "autumn_leaves".

The reason for this is due to the high Spearman correlation value for the video sequence "autumn_leaves". Moreover, the value of the quality level for "autumn_leaves" using the Wang's Metrics is already very high (maximum value of 1), and therefore, the subjective rating of the video sequences by a group of observers varies greatly in this case.

Therefore, the HQSM generated according to the invention is able to improve the performance of the existing methods for video quality assessment.

The described embodiments of the invention apply not only to a method but also to a device, a computer readable medium and a computer program.

While the embodiments of the invention have been described, they are merely illustrative of the principles of the invention. Other embodiments and configurations may be devised without departing from the spirit of the invention and the scope of the appended claims.

The following documents are cited in this specification:
[1] Z. Wang, A. C. Bovik, "A universal image quality index", IEEE Signal Processing Letters, Vol. 9, No. 3, March 2002, Pg. 81-84.
[2] Z. Wang, H. R. Sheikh and A. C. Bovik, "No Reference perceptual quality assessment of JPEG compressed images", IEEE International Conference on Image Processing, 2002.
[3] Stefan Winkler, "Vision Models and Quality Metrics for Image Processing Applications", Ph.D. Thesis #2313, Swiss Federal Institute of Technology, Lausanne, Switzerland, 2000.
[4] S. Yao, et al, "Perceptual visual quality evaluation with multi-features", submitted to IEE Electric Letters.
[5] WO 99/21173
[6] US Patent Publication No. 2002/0126891
[7] EP 1109132
[8] U.S. Pat. No. 6,243,419
[9] Miroslaw Bober, "MPEG-7 Visual Shape Descriptors", IEEE Transaction on circuits and systems for video technology, Vol. 11, No. 6, June 2001.

What is claimed is:

1. A method for generating a quality oriented significance map for assessing the quality of an image or video, comprising the following steps:
 extracting features of the image or video using visual feature-based information and knowledge-based information;
 determining a perceptual quality requirement of at least one extracted feature; and
 integrating the extracted features and the perceptual quality requirement of the at least one extracted feature to form an array of significance level values using a nonlinear mapping function, thereby generating the quality oriented significance map;
 wherein coupling effects as a result of the integration of the extracted features are used when forming the array of the significance level values, and wherein the quality oriented significance map is obtained using the following equation:

$$m_{s,i,j,t} = \sum_{n}^{N} f_{s,i,j,t}^n - \sum_{k} c^{Lk} \cdot g_1(f_{s,i,j,t}^L, f_{s,i,j,t}^k)$$

wherein
 $m_{s,i,j,t}$ is an element of the quality oriented significance map at scale s, position (i, j) and time t;
 $f_{s,i,j,t}^n$ is the $n^{th}$ extracted feature,
 $c^{Lk}$ is a coupling factor which denotes the coupling effects of combining $f_{s,i,j,t}^L$ and $f_{s,i,j,t}^k$;
 n is the index extracted feature;
 k is another index of extracted feature such that 1<k<N and k≠L;
 N is the total number of extracted features;
 L is the maximum value of $f_{s,i,j,t}^n$ denoted as
 L=arg max($f_{s,i,j,t}^n$),
 $g_1$ is the nonlinear mapping function.

2. The method according to claim 1, wherein an absolute motion and a relative motion are determined, and are used to determine a quality level value of the pixel or region of the image or video, wherein the determined quality level value is a perceptual quality requirement used for generating the quality oriented significance map.

3. The method according to claim 1, wherein the nonlinear mapping function is defined as:

$$g_1(x,y) = \min(x,y).$$

4. The method according to claim 1, wherein the integration of the extracted features is performed by determining a weight to each of the extracted features, adding the weighted extracted features, and applying the nonlinear mapping function to the accumulated features, thereby forming the array of the visual significance level values.

5. The method according to claim 4, wherein the quality oriented significance map is obtained using the following equation:

$$m_{s,i,j,t} = g_2(w_1 f_{s,i,j,t}^1 + w_2 f_{s,i,j,t}^2 + \ldots + w_n f_{s,i,j,t}^n)$$

wherein
 $m_{s,i,j,t}$ is an element of the quality oriented significance map at scale s, position (i, j) and time t;
 $w_n$ is weight of the extracted feature;
 $f_{s,i,j,t}^n$ is the extracted feature;
 n is the index of the extracted feature; and
 $g_2$ is the nonlinear mapping function.

6. The method according to claim 5, wherein the nonlinear mapping function is defined as:

$$g_2(x) = \sqrt[\alpha]{x + C}$$

wherein α is a parameter for giving a nonlinear property, and
C is a constant.

7. The method according to claim 1, the generated quality oriented significance map is further processed in a post processing step to enhance the quality of the generated quality oriented significance map.

8. The method according to claim 7, wherein the post processing step is performed using a Gaussian smoothing technique.

9. A device for generating a quality oriented significance map for assessing the quality of an image or video, comprising:
 an feature extraction unit for extracting features of the image or video using visual feature-based information and knowledge-based information;
 a determination unit for determining a perceptual quality requirement of at least one extracted feature; and an integration unit for integrating the extracted features and the perceptual quality requirement of the at least one extracted feature to form an array of significance level values using a nonlinear mapping function, thereby generating the quality oriented significance map;

wherein coupling effects as a result of the integration of the extracted features are used when forming the array of the significance level values, and wherein the quality oriented significance map is obtained using the following equation:

$$m_{s,i,j,t} = \sum_{n}^{N} f_{s,i,j,t}^{n} - \sum_{k} c^{Lk} \cdot g_1(f_{s,i,j,t}^{L}, f_{s,i,j,t}^{k})$$

wherein $m_{s,i,j,t}$ is an element of the quality oriented significance map at scale s, position (i, j) and time t;

$f_{s,i,j,t}^{n}$ is the $n^{th}$ extracted feature, $c^{Lk}$ is a coupling factor which denotes the coupling effects of combining $f_{s,i,j,t}^{L}$ and $f_{s,i,j,t}^{k}$;

n is the index of the extracted feature;

k is another index of extracted feature such that 1<k<N and k≠L;

N is the total number of extracted features;

L is the maximum value of $f_{s,i,j,t}^{n}$ denoted as L=arg max($f_{s,i,j,t}^{n}$), $g_1$ is the nonlinear mapping function.

10. A computer readable medium, having a program recorded thereon, wherein the program is to make the computer execute a procedure for generating a quality oriented significance map for assessing the quality of an image or video, comprising the following steps:

extracting features of the image or video using visual feature-based information and knowledge-based information;

determining a perceptual quality requirement of at least one extracted feature; and integrating the extracted features and the perceptual quality requirement of the at least one extracted feature to form an array of significance level values using a nonlinear mapping function, thereby generating the quality oriented significance map;

wherein coupling effects as a result of the integration of the extracted features are used when forming the array of the significance level values, and wherein the quality oriented significance map is obtained using the following equation:

$$m_{s,i,j,t} = \sum_{n}^{N} f_{s,i,j,t}^{n} - \sum_{k} c^{Lk} \cdot g_1(f_{s,i,j,t}^{L}, f_{s,i,j,t}^{k})$$

wherein $m_{s,i,j,t}$ is an element of the quality oriented significance map at scale s, position (i, j) and time t;

$f_{s,i,j,t}^{n}$ is the $n^{th}$ extracted feature, $c^{Lk}$ is a coupling factor which denotes the coupling effects of combining $f_{s,i,j,t}^{L}$ and $f_{s,i,j,t}^{k}$;

n is the index of the extracted feature;

k is another index of extracted feature such that 1<k<N and k≠L;

N is the total number of extracted features;

L is the maximum value of $f_{s,i,j,t}^{n}$ denoted as L=arg max($f_{s,i,j,t}^{n}$), $g_1$ is the nonlinear mapping function.

* * * * *

UNITED STATES PATENT AND TRADEMARK OFFICE
CERTIFICATE OF CORRECTION

PATENT NO.       : 7,590,287 B2                                        Page 1 of 1
APPLICATION NO.  : 10/534415
DATED            : September 15, 2009
INVENTOR(S)      : Lu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Twenty-first Day of September, 2010

David J. Kappos
*Director of the United States Patent and Trademark Office*